Patented Oct. 3, 1950

2,524,069

UNITED STATES PATENT OFFICE 2,524,069

CHLORINATED ORTHONITROBIPHENYL MITICIDE COMPOSITION

Henry L. Morrill, Clayton, Mo., and Carl J. Weinman, Champaign, Ill., assignors to Monsanto Chemical Company, St. Louis, Mo., a corporation of Delaware No Drawing. Application May 16, 1946, Serial No. 670,308

9 Claims. (Cl. 167—30)

This invention relates to miticides and more particularly to a novel miticide composition.

Many organic substances which possess insecticidal properties have been found to possess little or no effect in killing mites such as red spiders. Other organic substances are toxic to mites in the adult stage but not in the egg stage and hence must be applied at very short intervals to plants in order to control the mites from cycle to cycle. Frequent treatment of plants with many organic substances which are effective as miticides results in most instances in serious damage to the plant foliage. Most of the organic compositions which have been found effective for the control of mites in plants, shrubs and trees, tend to burn the plant. In many instances substantial injury to the foliage is not tolerable. For example, in the control of mites on ornamental plants, only minor degrees of leaf burn can be tolerated. In other instances, for example in the case of citrus fruits, the injury to the fruit caused by the treating chemical frequently gives rise to a down-grading of the fruit that is scarcely less serious to the fruit grower than the injury caused by the presence of mites on the fruit.

One of the objects of the present invention is to provide an effective miticide composition that will control mites from the egg to the adult stage on plants, shrubs and trees with negligible injury to the foliage and fruit.

Another object is to provide a novel miticide composition containing as the active constituent a chlorinated orthonitrobiphenyl material.

A further object is to provide a novel chlorinated orthonitrobiphenyl composition which is effective for the extended control of mites from the egg to the adult stage on plants, shrubs and trees with a minimum of phytotoxicity toward the treated vegetation.

Further objects will become apparent from the following description.

According to the present invention, generally stated, an effective miticide composition producing negligible phytotoxic effects on plants, shrubs and trees and having substantial residual toxicity to mites may be provided by incorporating with a suitable carrier a chlorinated orthonitrobiphenyl composition resulting from the direct chlorination in the presence of a catalyst of orthonitrobiphenyl to a chlorine content within the range of approximately 8% to approximately 22% and a specific gravity at 40°/15.5° C. within the range of approximately 1.24 to approximately 1.35, followed by removal of catalyst and residual hydrogen chloride. The resulting chlorinated orthonitrobiphenyl is desirably distilled to obtain a product having a minimum of phytotoxicity. The chlorinated orthonitrobiphenyl employed in the present invention is generally a liquid when prepared, but on standing tends to crystallize.

The chlorinated orthonitrobiphenyl hereinabove described may be fractionated if desired and the various fractions obtained may be employed individually or in admixture in preparing the miticide compositions of the present invention. For example, a fraction of chlorinated orthonitrobiphenyl having a chlorine content of approximately 15.27% and a specific gravity at 40°/15.5° C. of approximately 1.299 may be isolated from a mixture of chlorinated orthonitrobiphenyls having a higher chlorine content. This fraction corresponds essentially to a mixture of isomeric monochloro-orthonitrobiphenyls and is a very desirable fraction for the purpose of the present invention, since the fraction appears to provide a maximum of effectiveness against mites on all stages from the egg to the adult with a minimum of phytotoxicity when properly combined with a suitable carrier. A material of similar properties, although probably somewhat different in composition with respect to isomers and homologs may be obtained by direct chlorination of orthonitrobiphenyl to a chlorine content of 15.27% and a specific gravity of approximately 1.299. This product, when catalyst and residual hydrogen chloride are removed, and particularly when the product is distilled, was found to possess very low phytotoxicity coupled with very effective toxicity toward mites.

The chlorinated orthonitrobiphenyls employed in the novel miticide composition of the present invention may be prepared by chlorinating orthonitrobiphenyl directly in the presence of an iron catalyst. The catalyst may be anhydrous ferric chloride, ferric oxide and metallic iron, both iron and metallic oxide reacting during the chlorination to give iron chlorides that are effective catalysts. Other catalysts may be used including antimony chloride, aluminum chloride or its equivalent, or aluminum metal, although reaction conditions must be carefully controlled to approximate the specific conditions disclosed herein for the chlorination in the presence of iron or ferric chloride. In general, less than 1% of anhydrous ferric chloride is a sufficient proportion of catalyst, or chlorination in the presence of an equivalent amount of iron may be used.

The chlorination of orthonitrobiphenyl may be conducted in any suitable apparatus, for example the apparatus described in U. S. Pat. No. 1,892,397, and substantially as therein described for the chlorination of biphenyl except for temperatures. The preferred temperature range for chlorination of orthonitrobiphenyl for the purpose of preparing the active component of the novel miticide compositions of the present invention is approximately 35–40° C., although variations on either side of this range are possible. The orthonitrobiphenyl is chlorinated until the combined chlorine content of the resulting composition is within the range of 8% to 22%, which corresponds approximately to the substitution by chlorine of 0.5 to 1.5 atoms of hydrogen of the orthonitrobiphenyl molecule. The extent of the chlorination can be determined as the chlorination progresses, for example by noting the decrease in weight of the chlorine cylinder, provided reaction is fairly complete so that no appreciable amount of chlorine passes through the batch unreacted. However, it is more convenient in plant practice to note the progress of the chlorination by measurement of the specific gravity of the reaction mixture. The specific gravity at 40° C. (compared to water at 15.5° C., which is referred to herein as specific gravity at 40°/15.5° C.) of the chlorinated mixture will be in the range of approximately 1.24 to approximately 1.35. This range of 1.24 to 1.35 in the specific gravity at 40°/15.5° C. does not cover exactly the same range as 8–22% chlorine content but closely approximates that range. Following the chlorination the catalyst and residual hydrogen chloride are removed and the product is desirably distilled.

The chlorination may also be conducted in a solvent such as carbon tetrachloride or higher boiling inert solvents, in which event the chlorination may be more easily controlled. The choice of a solvent and proper reaction conditions must be selected with care, however, since both the solvent and temperature have some effect on the isomeric constituents of the resulting composition. The direct chlorination in the absence of a solvent is capable of adequate control and since the production from a single unit is greater, I prefer to conduct the chlorination in the absence of a solvent.

As an illustration of the preparation of a chlorinated orthonitrobiphenyl composition for the purpose of the present invention, 10 pounds of orthonitrobiphenyl were chlorinated at a temperature in the range of 35–40° C. using 0.6% of anhydrous ferric chloride as a catalyst. The reaction was carried to a gain in weight corresponding to 103% monochlorination. Thereafter the reaction mixture was aerated at 90° C. with 5 volumes of air to remove dissolved gases so that the actual gain in weight corresponded to 97% of monochlorination. The product was then stirred with 3% by weight of hydrated lime at 90° C. for one hour and was thereafter filtered using 1% by weight of Hi-Flow Supercel (diatomaceous earth). The dark oil produced was employed in the preparation of the novel miticide compositions of the present invention. A portion of the dark oil was distilled to provide a monochloro-orthonitrobiphenyl having a chlorine content of 15.27% and a specific gravity at 40°/15.5° C. of 1.299.

As a desirable alternative purification procedure, the chlorinated orthonitrobiphenyl may be treated by bubbling steam through the batch of chlorinated material at a temperature of about 120–150° C. or higher to hydrolyze any metallic chlorides and remove hydrogen chloride formed in the hydrolysis. The amount of steam to use for the hydrolysis will vary with the amount and type of catalyst present. When iron metal is used as catalyst for the chlorination approximately 10% steam by weight of the batch is usually sufficient to effect substantially complete hydrolysis of the iron chloride present in the batch and drive out the resulting hydrogen chloride. The product is then aerated with dry air at a temperature in the range of 120–150° C. to remove residual traces of hydrogen chloride. Slaked lime corresponding to approximately 1% or more of the weight of the batch is then added and the batch is stirred thoroughly at a temperature in the range of 120–150° C. The lime-treated material is subsequently passed through a centrifuge, preferably of the solid-bowl (imperforate basket) type to separate the sludge of iron hydroxide and iron from the product. The product may then be distilled to further enhance the purity of the material and thereby to further reduce the phytotoxicity of the material.

The novel miticide composition of the present invention may be prepared by dispersing a chlorinated orthonitrobiphenyl composition of the type hereinbefore described in a suitable organic solvent, for example acetone, pine oil, alkylated napthalenes, or partially hydrogenated diphenyl-terphenyl mixtures, together with a wetting, dispersing and emulsifying agent. Examples of wetting agents suitable for the purpose of the present invention are sulfosuccinic acid dialkyl esters, such as sodium dioctyl sulfosuccinate and sodium didecyl sulfosuccinate; N,N-dialkyl-cyclohexylamine dodecyl sulfate and similar products wherein the alkyl groups contain from 1 to 4 carbon atoms and the dodecyl group is replaced by alkyl groups containing from 10 to 18 carbon atoms such as N,N-dimethyl-cyclohexylamine octadecyl sulfate, N,N-diethyl-cyclohexylamine decyl sulfate and the like; sodium alkylated biphenyl sulfonates such as sodium monobutyl-, monoamyl- or monooctyl-biphenyl sulfonate; disodium dialkylated o-phenylphenol disulfonates such as disodium dibutyl-o-phenylphenol disulfonate and disodium dihexyl-o-phenylphenol disulfonate; sodium butylnaphthalene sulfonate; sodium decyl or dodecyl sulfate and the like; condensation products of ethylene oxide and an alkyl-substituted hydroxy compound of the benzene series, such as n-butylphenol, diisobutylphenol, isoamylcresols and isohexylxylenols; and alkali metal salts of decyl-, dodecyl-, tetradecyl- or octadecyl-benzene sulfonic acid, as well as the corresponding di- or tri-sulfonated products. The composition formed by mixing the chlorinated orthonitrobiphenyl, solvent and wetting, dispersing and emulsifying agent serves as a concentrate which may then be diluted with water to a ratio of chlorinated orthonitrobiphenyl to water in the range of 1:200 to 1:1000 or more, and desirably in the range of 1:300 to 1:800. The mixture is then agitated, for example in a spray tank to provide an emulsion which is then sprayed on the plants, shrubs or trees on which mite control is desired. The treatment thus applied to the vegetation endures for approximately a month under desirable circumstances, depending upon the degree of exposure of the plants to the weather, the temperature of the environment and the amount of heavy rainfall during the period following the treatment.

The chlorinated orthonitrobiphenyls without a carrier may be vaporized, for example on a hot plate within a confined area such as a greenhouse, a tent or a hood, or the vapors may be led into the confined area to provide excellent control of mites on plants and shrubs within the confined area. Following the vaporizing treatment, the hood or tent, if used, may be removed from the vicinity of the plants or shrubs.

As an alternative, the chlorinated orthonitrobiphenyl composition may be blended or otherwise mixed, for example in the molten or solid states or in solution in a suitable solvent, with an inert substance in finely divided form, such as pyrophyllite, diatomaceous earth, bentonite or talc to form a dust which may be applied in this form, or in aqueous suspension, to plants, shrubs or trees with a duster, or in the case of aqueous suspensions a sprayer. Any desired method of formulating the miticide composition may be used and any auxiliary ingredients such as adhesives, absorbents, light reflecting agents, spreaders, other insect toxicants and other agents found useful in formulations of this type may be incorporated in the miticide composition if desired.

The following examples will serve to illustrate the novel miticide composition of the present invention. These examples are to be construed as merely illustrative of the invention and not as limiting the invention except as defined in the appended claims.

*Example I*

|  | Percent by weight |
| --- | --- |
| Chlorinated orthonitrobiphenyl | 50 |
| Pine oil | 25 |
| N,N-diethyl-cyclohexylamine alkyl sulfate (C<sub>8</sub>–C<sub>18</sub>) | 25 |

The chlorinated orthonitrobiphenyls employed in this example contained 8.1% chlorine and had a specific gravity of approximately 1.244 at 40°/15.5° C. The catalyst and residual hydrogen chloride were removed from the material.

The components were mixed in a suitable vessel and the resulting mixture was poured into sufficient water to provide a ratio of chlorinated orthonitrobiphenyl to water of 1:300. The mixture was agitated to form an emulsion and the resulting emulsion was sprayed on snap dragons, carnations and roses infested with red spider in various stages including mobile stages, larvae and live resting stages. On observation four days after the plants were sprayed, it was found that there were substantially no mites in the mobile, larvae and resting stages alive on the plants. One month after the treatment, the plants were still free from mites. The injury to the foliage was very slight and was found to be within the limit tolerated for plants of this type when sold in the market.

*Example II*

Laboratory tests were made on excised rose leaves infested with red spiders in various stages from mobile stages through larvae to live resting stages. Samples of chlorinated orthonitrobiphenyl containing respectively from 8.24 to 34.65% chlorine and also a sample of unchlorinated orthonitrobiphenyl were dispersed in a mixture of 65% acetone and 35% water. The resulting mixture was sprayed on the infested excised leaves. The following table identifies the respective chemicals tested ranging from unchlorinated orthonitrobiphenyl to chlorinated orthonitrobiphenyl containing increasing amounts of chlorine. The table shows also the concentration of the orthonitrobiphenyl material in the liquid medium and the average per cent kill of mobile stages of red spider on the excised leaves at dilutions of 1:500, 1:1000 and 1:2000. The chlorinated orthonitrobiphenyls employed in these tests were refined by removal of catalyst and residual hydrogen chloride and subsequent distillation of the chlorinated biphenyls.

| Per Cent Chlorine In o-Nitrobiphenyl Material | Average Per Cent Kill of Red Spiders At Dilution Indicated | | |
| --- | --- | --- | --- |
|  | 1:500 | 1:1000 | 1:2000 |
| None | 99 | 41 | 10 |
| 8.24 | 100 | 99 | 96.7 |
| 15.27 | 100 | 100 | 100 |
| 21.06 | 100 | 100 | 99.7 |
| 26.26 | 96.5 | 95.9 | 75.6 |
| 31.18 | 93.4 | 76.9 | 76.5 |
| 34.65 | 89.6 | 65.4 | 49 |

Observations made four days after spraying the excised leaves revealed that the leaves treated with the compositions containing respectively chlorinated orthonitrobiphenyls having a chlorine content of 8–21% had suffered only minor phytotoxic injury whereas the leaves treated with compositions containing respectively from 26% to 34% chlorine showed evidence of appreciable leaf burn. The leaves treated with unchlorinated orthonitrobiphenyl still contained live red spiders from the mobile stage through the larvae to the resting stage. The leaves treated with the miticide compositions were substantially free of red spiders in mobile and resting stages and sustained only negligible injury from the treatment.

*Example III*

The following formulations will serve to illustrate specific miticide formulations coming within the scope of the present invention. Each of these formulations was prepared in the manner described in Example I and each formulation was tested and was found to be effective in the control on growing plants of a variety of mites including pear leaf blister mite, pacific red spider mite and citrus red mite, without giving rise to more than minor injury to the plants, the injury being well within the tolerable minimum for the plants. Catalyst and residual hydrogen chloride were removed from the chlorinated orthonitrobiphenyls employed in these tests and the chlorinated orthonitrobiphenyls were distilled.

|  | Percent by weight |
| --- | --- |
| Chlorinated orthonitrobiphenyl (15.27% Cl) | 30 |
| Partially hydrogenated liquid diphenyl-terphenyl mixture | 20 |
| Pine oil | 20 |
| N,N-Diethyl-cyclohexylamine alkyl (C<sub>8</sub>–C<sub>18</sub>) sulfate | 30 |

Dilution with water: 1 to 800.

|  | |
| --- | --- |
| Chlorinated orthonitrobiphenyl (15.27% Cl) | 30 |
| Alpha-methylnaphthalene | 40 |
| N,N-Diethyl-cyclohexylamine alkyl (C<sub>8</sub>–C<sub>18</sub>) sulfate | 30 |

Dilution with water: 1 to 600.

|  | |
| --- | --- |
| Chlorinated orthonitrobiphenyl (15.27% Cl) | 40 |
| Pine oil | 15 |
| N,N-Diethyl-cyclohexylamine algyl (C<sub>8</sub>–C<sub>18</sub>) sulfate | 40 |
| Partially hydrogenated liquid diphenyl-terphenyl mixture | 5 |

Dilution with water: 1 to 800.

|  | |
| --- | --- |
| Chlorinated orthonitrobiphenyl (15.27% Cl) | 50 |
| Pine oil | 20 |
| Alpha-methylnaphthalene | 10 |
| Sodium decylbenzene sulfonate | 12 |
| Water | 8 |

Dilution with water: 1 to 200.

| | Percent by weight |
|---|---|
| Chlorinated orthonitrobiphenyl (15.27% Cl) | 30 |
| Alpha-methylnaphthalene | 40 |
| Naphthenic acid derivative of polyethylene oxide | 30 |

Dilution with water: 1 to 1000.

The partially hydrogenated liquid diphenyl-terphenyl mixture employed in the above formulations was prepared according to U. S. 2,364,719.

*Example IV*

| | Percent by weight |
|---|---|
| Chlorinated orthonitrobiphenyl (21.06% Cl) | 5 |
| Diatomaceous earth | 95 |

The chlorinated orthonitrobiphenyl material was melted and blended with the diatomaceous earth. The resulting dust was dusted on rose plants and was found to give excellent control of red spiders thereon.

We claim:

1. A miticide composition comprising a chlorinated orthonitrobiphenyl obtained by the direct chlorination of orthonitrobiphenyl until the chlorine content of the biphenyl derivative is within the range of approximately 8 to 22% and the specific gravity at 40°/15.5° C. is within the range of approximately 1.24 to approximately 1.35, a carrier, and a wetting, dispersing and emulsifying agent.

2. A miticide spray composition comprising a chlorinated orthonitrobiphenyl mixture obtained by the direct chlorination of orthonitrobiphenyl until the chlorine content of the biphenyl derivative is within the range of approximately 8 to 22% and the specific gravity at 40°/15.5° C. is within the range of approximately 1.24 to approximately 1.35, a carrier, a wetting, dispersing and emulsifying agent, and water, said mixture being in the form of an oil-in-water emulsion.

3. A miticide concentrate comprising a chlorinated orthonitrobiphenyl obtained by the direct chlorination of orthonitrobiphenyl until the chlorine content of the biphenyl derivative is within the range of approximately 8 to approximately 22% and the specific gravity at 40°/15.5° C. is in the range of approximately 1.24 to approximately 1.35, a solvent for said biphenyl derivative and a wetting, dispersing and emulsifying agent.

4. A miticide composition comprising a chlorinated orthonitrobiphenyl obtained by the direct chlorination of orthonitrobiphenyl until the chlorine content of the biphenyl derivative is approximately 15.27% and the specific gravity at 40°/15.5° C. is approximately 1.299, a carrier and a wetting, dispersing and emulsifying agent.

5. A miticide spray composition comprising a chlorinated orthonitrobiphenyl obtained by the direct chlorination of orthonitrobiphenyl until the chlorine content of the biphenyl derivative is approximately 15.27% of the specific gravity at 40°/15.5° C. is approximately 1.299, a solvent for said biphenyl derivative, a wetting, dispersing and emulsifying agent and water, said mixture being in the form of an emulsion.

6. A miticide spray composition comprising a chlorinated orthonitrobiphenyl mixture obtained by the direct chlorination of orthonitrobiphenyl until the chlorine content of the biphenyl derivative is within the range of approximately 8 to 22% and the specific gravity at 40°/15.5° C. is within the range of approximately 1.24 to approximately 1.35, and the subsequent removal of catalyst and residual hydrogen chloride from the chlorinated orthonitrobiphenyl, a carrier, a wetting, dispersing and emulsifying agent, and water, said mixture being in the form of an oil-in-water emulsion, the ratio of said chlorinated orthonitrobiphenyl to water being within the range of 1:200 to 1:1000.

7. A miticide spray composition comprising a chlorinated orthonitrobiphenyl mixture obtained by the direct chlorination of orthonitrobiphenyl until the chlorine content of the biphenyl derivative is within the range of approximately 8 to 22% and the specific gravity at 40°/15.5° C. is within the range of approximately 1.24 to approximately 1.35, and the subsequent removal of catalyst and residual hydrogen chloride from the chlorinated orthonitrobiphenyl, a carrier, a wetting, dispersing and emulsifying agent, and water, said mixture being in the form of an oil-in-water emulsion, the ratio of said chlorinated orthonitrobiphenyl to water being within the range of 1:300 to 1:800.

8. A miticide dust composition comprising chlorinated orthonitrobiphenyl obtained by the direct chlorination of orthonitrobiphenyl until the chlorine content of the biphenyl derivative is within the range of approximately 8 to 22% and the specific gravity at 40°/15.5° C. is within the range of approximately 1.24 to approximately 1.35, and a solid inert carrier.

9. A miticide spray composition comprising a chlorinated orthonitrobiphenyl mixture obtained by the direct chlorination of orthonitrobiphenyl until the chlorine content of the biphenyl derivative is within the range of approximately 8 to 22% and the specific gravity at 40°/15.5° C. is within the range of approximately 1.24 to approximately 1.35, the subsequent removal of catalyst and residual hydrogen chloride from the chlorinated orthonitrobiphenyl and the distillation of the chlorinated orthonitrobiphenyl, a carrier, a wetting, dispersing and emulsifying agent, and water, said mixture being in the form of an oil-in-water emulsion, the rato of said chlorinated orthonitrobiphenyl to water being within the range of 1:200 to 1:1000.

HENRY L. MORRILL.
CARL J. WEINMAN.

REFERENCES CITED

The following references are of record in the file of this patent:

UNITED STATES PATENTS

| Number | Name | Date |
|---|---|---|
| 1,907,493 | Britton | May 9, 1933 |
| 2,044,010 | Mills | June 16, 1936 |
| 2,079,450 | Harris | May 4, 1937 |
| 2,134,556 | Hester | Oct. 25, 1938 |
| 2,329,074 | Muller | Sept. 7, 1943 |
| 2,343,415 | Kaufert | Mar. 7, 1944 |
| 2,349,572 | Coleman | May 23, 1944 |
| 2,370,113 | Jenkins | Feb. 20, 1945 |
| 2,374,999 | Holbrook | May 1, 1945 |

OTHER REFERENCES

Bradsher et al., Jour. Am. Chem. Soc., vol. 68, pp. 404–405 (1946).

Raiford et al., Jour. Am. Chem. Soc., vol. 56, page 680 (1934).

Mascarelli et al., Gazz. Ital. Chem., vol. 61, page 788 (1931).

Mascarelli et al., Gazz. Ital. Chem., vol. 63, pp. 56–57 (1933).

Jour. Econ. Ent., vol. 33, Aug. 1940, pages 670–675.